United States Patent
Imai et al.

(10) Patent No.: US 8,431,225 B2
(45) Date of Patent: Apr. 30, 2013

(54) COMPOSITE MATERIAL ENGINEERED FROM METAL AND RESIN AND PRODUCTION METHOD THEREOF

(75) Inventors: Hideyuki Imai, Aichi-ken (JP); Yoshinori Nagamori, Aichi-ken (JP); Shinichi Takeda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 374 days.

(21) Appl. No.: 12/654,226

(22) Filed: Dec. 15, 2009

(65) Prior Publication Data

US 2010/0197882 A1    Aug. 5, 2010

(30) Foreign Application Priority Data

Jan. 30, 2009  (JP) ................. 2009-021017

(51) Int. Cl.
| B32B 7/12 | (2006.01) |
| B32B 15/082 | (2006.01) |
| B32B 15/092 | (2006.01) |
| B32B 15/20 | (2006.01) |
| B32B 37/12 | (2006.01) |

(52) U.S. Cl.
USPC ........... 428/418; 428/419; 428/420; 428/463; 428/474.4; 428/480

(58) Field of Classification Search .................. 428/457
See application file for complete search history.

(56) References Cited

U.S. PATENT DOCUMENTS

| 4,232,086 A * | 11/1980 | Mori et al. ............ 428/341 |
| 6,203,919 B1 * | 3/2001 | Takebe et al. ............ 428/461 |
| 2004/0024124 A1 * | 2/2004 | Imaizumi et al. ............ 525/88 |
| 2009/0082525 A1 | 3/2009 | Nakamura et al. |
| 2009/0142589 A1 * | 6/2009 | Shoji et al. ............ 428/336 |
| 2010/0279108 A1 | 11/2010 | Kuroyama et al. |

FOREIGN PATENT DOCUMENTS

| JP | A-H05-214071 | 8/1993 |
| JP | A-2000-273168 | 10/2000 |
| JP | A-2003-103562 | 4/2003 |
| JP | A-2004-058646 | 2/2004 |
| JP | A-2007-050630 | 3/2007 |
| JP | A-2007-175873 | 7/2007 |
| JP | A-2007-221099 | 8/2007 |
| WO | WO 2007066796 A1 * | 6/2007 |
| WO | WO 2009/078377 A1 | 6/2009 |

OTHER PUBLICATIONS

Notification of First Office Action issued Jan. 18, 2012 by the State Intellectual Property Office of P.R.C. in the corresponding Chinese Patent Application No. 201010107472.9 (and English translation).
Office Action issued June 29, 2012 in the corresponding Japanese Patent Application No. 2009-021017 (and English translation).

* cited by examiner

*Primary Examiner* — Ramsey Zacharia
(74) *Attorney, Agent, or Firm* — Posz Law Group, PLC

(57) ABSTRACT

A composite material engineered from metal and resin and a production method of the composite material. The composite material includes a metal portion composed of metal; a resin portion composed of resin; a polar functional group imparted to a surface of the metal portion; and an adhesion modifying agent mixed in the resin and including an adhesive functional group which interacts with the polar functional group. The metal portion and the resin portion are bonded by the interaction between the polar functional group and the adhesive functional group.

11 Claims, 1 Drawing Sheet

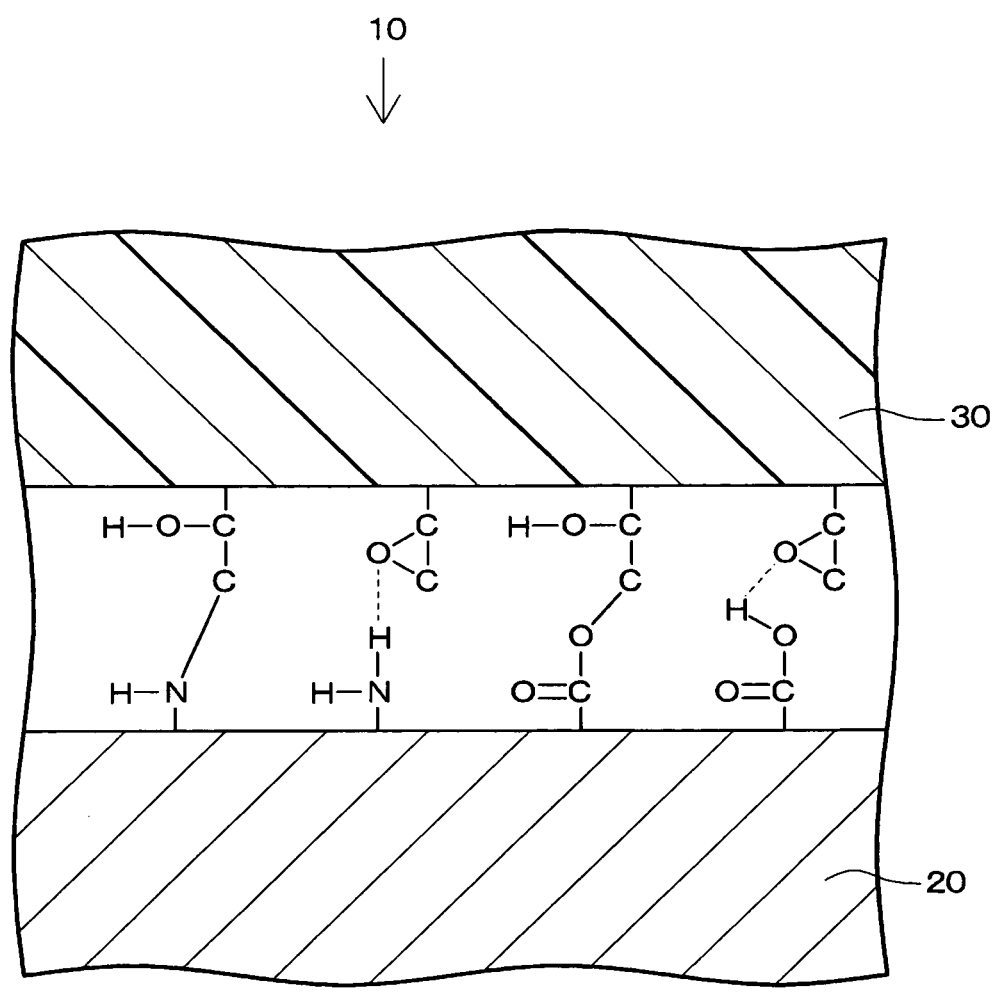

COMPOSITE MATERIAL ENGINEERED FROM METAL AND RESIN AND PRODUCTION METHOD THEREOF

CROSS REFERENCE TO RELATED APPLICATIONS

The present application claims priority from Japanese patent application No. 2009-021017 filed on Jan. 30, 2009, and the entire subject matter of which is incorporated herein by reference.

TECHNICAL FIELD

The present invention relates to a composite material in which a metal portion composed of metal is bonded to a resin portion composed of resin, and a production method thereof.

BRIEF DESCRIPTION OF RELATED ART

Recently, various composite materials are developed. Such composite materials are engineered from bonded different materials and utilize the characteristics of the bonded materials. Especially, since metal and resin have characteristics distinct from each other, the composite materials engineered from metal and resin have unprecedented characteristics. Accordingly, it is expected that their use will further increase in the future.

For a method of bonding metal and resin in a composite material engineered from metal and resin, a bonding method using anchor effect of unevenness formed on a surface of the metal or a bonding method using an adhesive are generally known. For example, JP-A-2000-273168 describes such adhesive.

However, the bonding method by anchor effect has small adhesion strength. Especially, when subjected to a thermal test with repetition of rising and falling temperature, the metal and the resin are broken at an interface between them.

On the other hand, the bonding method by an adhesive requires an adhesive layer at an interface between the metal and the resin, and therefore requires a lot of working processes.

As a method for bonding metal and resin other than the above described ones, a bonding method with epoxy resin mixed in polyarylene sulfide resin as described in JP-A-H05-214071 or a boding method with a heat denatured epoxy film formed on a surface of metal as described in JP-A-2004-58646 is proposed. However, these proposed methods do not secure enough bonding strength.

SUMMARY

Embodiments of the present invention addresses above described problem by providing a composite material engineered from metal and resin and a production method of the composite material. The composite material according to embodiments of the present invention has a strong bond between metal and resin without adhesive.

Here, the strong bond means a bond between the metal and the resin which is not broken under a tension active at the interface between the metal and the resin when the both portions are pulled in an opposite direction.

A composite material engineered from metal and resin according to embodiments the present invention is a composite material in which a metal portion composed of metal and a resin portion composed of resin are bonded. The composite material includes a polar functional group imparted to a surface of the metal portion and the resin blended with an adhesion modifying agent which contains an adhesive functional group interacts with the polar functional group. The metal portion and the resin portion are bonded by at least a chemical bond between the polar functional group and the adhesive functional group.

There are two embodiments of the way the polar functional group is imparted. In the first embodiment, the polar functional group is imparted directly on the surface of the metal portion by a chemical bond to the surface. In the second embodiment, the polar functional group is imparted on the surface of the metal portion as a compound layer including the polar functional group. The two embodiments are included in this specification.

The interaction between the polar functional group and the adhesive functional group is a chemical bond formed between the two functional groups such as a hydrogen bond, a covalent bond, an ion bond, a van der Waals bond or the like.

A production method of a composite material according to embodiments of the present invention is a method of producing a composite material in which a metal portion composed of metal and a resin portion composed of resin are bonded. The production method includes treating surface by imparting a polar functional group to a surface of the metal portion, preparing a molding material by mixing the resin with an adhesion modifying agent, which includes an adhesive functional group which interacts with the polar functional group to the resin, molding the resin portion from the molding material so that the resin portion contacts with the metal portion, and bonding the metal portion and the resin portion by the interaction between the polar functional group and the adhesive functional group.

Below is explanation of exemplary embodiments of each element of the present invention.

Metal Portion

A non-limited exemplary shape of the metal portion may be a plate, a film, and a block or the like. The shape of the metal portion is not limited and depends on the use of the composite material. The shape forming of the metal portion may be performed by a machine or may be performed after the metal portion is bonded to the resin portion.

A non-limited example of metal used for the metal portion is copper, nickel, tin, gold, silver, aluminum, iron, magnesium, chrome, tungsten, zinc, lead, or the like and alloys such as stainless, brass, or the like.

A non-limited example of a polar functional group imparted to the surface of the metal portion is a carboxyl group, an amino group, a hydroxyl group, an aldehyde group or the like. Since a carboxyl group and an amino group are easily imparted to the surface of the metal portion, they are preferred.

A non-limited embodiment of a surface treatment imparting the polar functional group to the surface of the metal portion is a coating treatment, a frame treatment, a vapor-deposition treatment, a plasma treatment or the like. These methods use a polar functional group-containing compound, a derivative thereof or the like.

A non-limited example of a compound or a derivative thereof which include a polar functional group is a carboxyl group-containing compound such as a monomer of acrylic acid, a polymer of acrylic acid, a copolymer of acrylic acid and maleic acid, a monomer of methacrylic acid, a polymer of methacrylic acid or the like and an amino group-containing compound such as a monomer of allylamine, a polymer of allylamine or the like. Also, as a non-limited embodiment of the derivative of a carboxyl group and an amino group is caprolactam, a polyamide or the like.

Resin Portion

A non-limited exemplary shape of the resin portion may be a plate, a film, and a block. It is preferably to shape form the resin portion in a predetermined shape depending on the use of the composite material when the resin portion is molded so as to contact with the metal portion, because it reduce the number of working processes.

A non-limited example of resin for the resin portion is an engineering resin such as polyphenylene sulfide (PPS), a polyamide (PA) or polybutylene terephthalate (PBT), an universal resin such as polyethylene (PE), polypropylene (PP), polystyrene (PS) or polyvinyl chloride (PVC), or the like. Especially, an engineering plastic is preferred since the characteristics of the composite material such as heat resistance are improved.

Also, glass fiber, inorganic filler, or the like may be mixed into the resin in order to improve mechanical strength thereof.

A non-limited example of the polyphenylene sulfide is a crosslinked type having a two-dimensional or three-dimensional crosslinked structure through oxygen in a molecule, or a linear type in which a molecule is arranged in a straight-chain form (structural units are linked in line).

A non-limited example of a polyamide is polyamide 6 (PA6), polyamide 11 (PA11), polyamide 12 (PA12), polyamide 66 (PA66), polyamide 6T (PA6T), polyamide 6I (PA6I), polyamide 9T (PA9T), aramid as an aromatic polyamide, or the like.

It is preferable that an adhesive modifying agent is easily and uniformly mixed in the resin. Such non-limited example of the adhesive modifying agent is a modified graft copolymer. The modified graft copolymer is given by modifying a graft copolymer having a polyethylene, a polystyrene or the like as a main chain and a styrenic polymer as a side chain with the adhesive functional group. Another non-limited example of the adhesive modifying agent is a compound in which polyethylene, polystyrene or the like is modified with the adhesive functional group, or the like. Specifically, the non-limited example is a modified ethylene-styrene copolymer in which a copolymer of ethylene and styrene is modified with glycidyl methacrylate, a modified polyethylene in which polyethylene is modified with glycidyl methacrylate, or the like.

The contained amount of the adhesive modifying agent depends on the kind of adhesive modifying agent (the kind of adhesive functional group, the amount of adhesive functional group in the adhesive modifying agent, or the like). A non-limited example of the preferred range of the content amount of the adhesive modifying agent is from 5 to 40 parts by weight based on 100 parts by weight of the total amount of the resin and the adhesive modifying agent. In a case where the content amount is less than 5 parts by weight, the adhesion of the resin portion to the metal portion is deteriorated. In a case where the content amount is more than 40 parts by weight, the releasability of the resin portion from a mold after the resin is molded is deteriorated. The more preferred content amount of the adhesive modifying agent is from 10 to 30 parts by weight based on 100 parts by weight of the total amount of the resin and the adhesive modifying agent.

A non-limited example of an adhesive modifying agent is an epoxy group (including an epoxy group in a glycidyl group, hereinafter the same), a carboxyl group, an amino group, a hydroxyl group or the like. An epoxy group is preferred because of easy reactivity with the polar functional group.

A suitable content amount of the adhesive functional group in the mixed compound of the resin and the adhesive modifying agent (which is a molding material) depends on the kind of the adhesive functional group. A non-limited example of a preferred range of the content amount is from 0.15 to 1.2 weight percent based on the total weight of the resin and the adhesive modifying agent. In a case where the content amount is less than 0.15 weight percent, the adhesion of the resin portion to the metal portion is deteriorated. In a case where the content amount is more than 1.2 weight percent, the releasability of the resin part from a mold is deteriorated when the resin portion is molded. The preferred content amount of the adhesive functional group is from 0.3 to 0.9 weight percent based on the total weight of the resin and the adhesive modifying agent.

A non-limited example of the mixing process for preparing a mold material by mixing the adhesive modifying agent to the resin is a process of performing melt kneading by using a single-screw or double-screw extruder or the like at predetermined temperature to homogenize the mixture, followed by pelletization, or the like.

A non-limited example of the molding process for molding the resin portion so as to contact with the metal portion is an insert molding using a metal mold in which the metal portion is supported. In this process, the bonding between the metal portion and the resin portion and the molding of the resin portion can be performed at the same time. A press molding or an injection molding is non-limited example of the insert molding. The molding process may include an annealing process.

The bond between the metal portion and the resin portion is supposed to be originated from an interaction between the polar functional group imparted to the surface of the metal portion and the adhesive functional group imparted to the resin portion. This interaction is an attractive interaction between atoms and electrons of the polar functional group and the adhesive functional group at the interface between the metal portion and the resin portion. Specifically, the interaction is a primary bond (such as an ion bond or a covalent bond) accompanied by transfer and sharing of electrons between the atoms of the polar functional group and the adhesive functional group, and a secondary bond (such as a hydrogen bond or a van der Waals bond) in which the uneven distribution of the electron density occurs in the polar functional group and the adhesive functional group, which causes both functional groups to attract each other by Coulomb force.

Composite Material Engineered from Metal and Resin

A non-limited shape of the composite material engineered from metal and resin is a plate shape, a film shape, a string shape, a pillar shape, a ball shape, a block shape, or the like.

A non-limited usage of the composite material engineered from metal and resin is a material for electronic parts, building materials, vehicle parts, agricultural materials, packaging materials, clothing, daily necessities, or materials for producing them. As vehicle parts, a sealing member for sealing a battery of a hybrid car or a seal member for sealing engine oil are non-limited examples thereof.

Accordingly, embodiments of the present invention provide a composite material engineered from metal and resin and a production method of the composite material. The composite material according to the present invention has a strong bond between metal and resin without adhesive.

BRIEF DESCRIPTION OF DRAWINGS

FIG. 1 is a sectional view of the composite material engineered from metal and resin in the vicinity of the interface between the metal portion and the resin portion.

DETAIL DESCRIPTION OF EXEMPLARY EMBODIMENT OF THE PRESENT INVENTION

Examples

An example of a composite material engineered from metal and resin according to the present invention is shown in FIG. 1. The composite material 10 has a metal portion 20 composed of metal on which surface at least one of a carboxyl group and an amino group is imparted, and a resin portion 30 in which an adhesion modifying agent including an epoxy group is mixed. The metal portion 20 and the resin portion 30 are bonded by a chemical bond at an interface between the metal portion 20 and the resin portion 30. The chemical bond is the one between the epoxy and at least one of the carboxyl group and the amino group.

Twenty five (25) examples of the present invention in each of which aluminum (A1050) was used for the metal portion were prepared and the adhesion strength thereof was evaluated. Another 15 comparative examples in each of which aluminum was used for the metal portion were prepared and the adhesion strength thereof was also evaluated.

The evaluation result of the 25 examples is shown in Table 1, and the evaluation result of the 15 comparative examples is shown in Table 2. The Tables 1 and 2 also show the kind of resin and the adhesive modifying agent and the content amount of the resin and the adhesive modifying agent. The unit of the amount of the resin and the adhesive modifying agent is parts by weight. The amount of the epoxy group shown in rows for the adhesive modifying agent is a ratio of the weight of the epoxy group in the adhesive modifying agent to the total weight of the resin and the adhesive modifying agent.

Compounds used for the surface treatment for the metal portion in the examples and comparative examples are also shown in Table 1 and 2. The mark "●" in rows for the surface treatment show the compound used for the surface treatment. (MW means molecular weight)

Below are materials used for the present examples and the comparative examples.

The metal portion was an aluminum plate (A1050) 75 mm long, 25 mm wide, and 2 mm thick.

The resin was polyphenylene sulfide (PPS), polyamide 66 (PA66) or polybutylene terephthalate (PBT).

The adhesive modifying agent was a modified polyethylene-polystyrene copolymer (modified PE/PS) in which a copolymer of ethylene and styrene was modified with glycidyl methacrylate (GMA), or a modified polyethylene (modified PE) in which polyethylene was modified with glycidyl methacrylate (GMA). Both the modified polyethylene-polystyrene copolymer and the modified polyethylene had a glycidyl methacrylate ratio of 10 weight percent and an epoxy group content of 3 weight percent. The modified polyethylene-polystyrene copolymer was a compound including a graft copolymer having polyethylene as a main chain and a styrenic monomer as a side chain, wherein the polyethylene as the main chain is modified with glycidyl methacrylate (GMA), and an epoxy group (glycidyl group) as an adhesive functional group.

The compound imparting the carboxyl group to the surface of the metal portion was a monomer of acrylic acid (molecular weight MW: 72), a polymer of acrylic acid (molecular weight MW: 5,000 to 800,000), a copolymer of acrylic acid and maleic acid (acrylic acid/maleic acid copolymer, molecular weight MW: 10,000).

The compound imparting both the carboxyl group and the amino group to the surface of the metal was a polyamide.

The compound imparting the amino group to the surface of the metal portion was a monomer of allylamine (molecular weight MW: 57) or a polymer of allylamine (molecular weight MW: 1,000 to 25,000).

Each sample of the examples and comparative examples were prepared in the following manner.

Pre-Treatment of Metal Portion

The surface of the metal portion was polished with sandpaper of #1000 grain size so as to remove oil. Then, the metal portion was immersed in hydrochloric acid of 23° C. for 1 minute for the surface etching. Further, it was immersed in an aqueous solution of a strong alkaline defatting agent ("FC-E2001" supplied from Nihon Parkerizing Co., Ltd.) at 70° C. for 1 minute to perform defatting.

Surface Treatment of Metal Portion

The compound used for each surface treatment was applied to the surface of the metal portion after the surface was subjected to the above pre-treatment. After that, a drying treatment was performed in a constant-temperature oven of 150° C. for 10 minutes to form a film (layer) composed of each compound on the surface of the metal portion. This treatment was not performed for comparative examples where the metal portion was not surface treated.

Mixing Process of Resin

The resin and the adhesive modifying agent were melt kneaded at a melting temperature of the resin used (PPS: 320° C., PA66: 300° C., PBT: 260° C.) for 5 minutes using a Laboplast mill ("KF70V2" manufactured by Toyo Seiki Seisakusho Co., Ltd.) to mix the adhesive modifying agent to the resin and thereby prepare a molding material.

Molding

After the metal portion subjected to the above-mentioned surface treatment was disposed in a mold, the above-mentioned molding material or resin was placed in the mold, and press molding was conducted at the above-mentioned melting temperature of the resin used in the forming material. Further, during molding, an annealing process was performed under the following conditions.

When the resin was PPS, the surface temperature of the mold was maintained at 150° C. for 3 hours. When the resin was PA66 or PBT, the surface temperature of the mold was maintained at 100° C. for 3 hours.

As described above, a plate-like composite material 75 mm long, 15 mm wide and 3 mm thick was obtained. In this composite material, the resin portion was bonded to the surface of the metal portion at a plane 12 mm long and 15 mm wide (area: 180 mm$^2$).

Evaluation

Evaluation of Adhesion strength was performed in the following manner.

The composite materials prepared as described above were tested in accordance with JIS K-6850 (a tensile shear bond strength testing method of an adhesive-a rigid material to be bonded) to cause a break in each composite material.

The evaluation result is shown as "A" in a case where the break occurred in the resin portion and shown as "B" in a case where the break occurred at an interface between the metal portion and the resin portion.

According to the above results, in all of examples (1 to 25), the break occurred in the resin portion. The reason is that at least one of the carboxyl group and the amino group imparted to the surface of the metal portion is chemically bonded to the epoxy group of the resin portion. In this case, therefore, the adhesion strength between the metal portion and the resin portion is higher than the strength of the resin portion.

On the other hand, in the comparative examples 1 to 6 in which the surface treatment of the metal portion was not performed (in the comparative examples 4 to 6, the adhesive modifying agent was contained in the resin), the break occurred at the interface between the metal portion and the resin portion. Further, of the comparative examples 7 to 15 in which the adhesive modifying agent was not mixed in the resin and only the surface treatment of the metal portion was performed, in the case where the resin of the resin portion was other than PA66 (except the case where the amino group was imparted to the surface of the metal portion), the break also occurred at the interface between the metal portion and the resin portion. The reason is that the adhesion strength between the metal portion and the resin portion is lower than the strength of the resin portion.

Second Examples

The adhesion strength of the second examples and the second comparative examples which are same as above 25 examples and 15 comparative examples except for that the metal portion is not composed of aluminum (A1050) but of copper (C1100) is evaluated. The second examples and the second comparative examples were prepared by same manner as the above described examples and comparative examples.

The evaluation results of the adhesion strength of the second examples are shown in Table 3, and that of the second comparative examples are shown in Table 4. Further, the kind of the resin used in the resin portions of the second examples and the second comparative examples and the amount of adhesive modifying agent mixed in the resin for the second examples and the second comparative examples are also shown in Tables 3 and 4. Furthermore, compounds used for the surface treatment of the metal portions of the second examples and the second comparative examples are also shown in Tables 3 and 4. The unit of the amount of the resins and the adhesive modifying agents in Tables 3 and 4 is parts by weight. The amount of the epoxy group shown in rows for the adhesive modifying agent is a ratio of the weight of the epoxy group in the adhesive modifying agent to the total weight of the resin and the adhesive modifying agent. The mark "●" in rows for the surface treatment show the compound used for the surface treatment. (MW means molecular weight)

According to the above results, in all of the second examples (26 to 50), the break occurred in the resin portion. That reason is that at least one of the carboxyl group and the amino group imparted to the surface of the metal portion is chemically bonded to the epoxy group of the resin portion. In this case, therefore, the adhesion strength between the metal portion and the resin portion is higher than the strength of the resin portion.

On the other hand, in the second comparative examples 16 to 21 in which the surface treatment of the metal portion was not performed (in the second comparative examples 19 to 21, the adhesive modifying agent was contained in the resin), the break occurred at the interface between the metal portion and the resin portion. Further, in the second comparative examples 22 to 30 in which the adhesive modifying agent was not mixed in the resin and only the surface treatment of the metal portion was performed, the break also occurred at the interface between the metal portion and the resin portion. The reason is that the adhesion strength between the metal portion and the resin portion is lower than the strength of the resin portion.

As described above, the composite material engineered from metal and resin of the present examples has a strong bond between the metal portion and the resin portion without adhesive.

Although the present invention is explained in detail with reference to a specific embodiment, it is obvious for a person having ordinary skills in the art to add various changes and modification without departing from the spirit and the scope of the present invention.

TABLE 1

| | | | | | | | | Example | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Resin | PPS | | 90 | 80 | 70 | 80 | 80 | 80 | 80 | 80 | | | 80 | 90 | 80 |
| | PA66 | | | | | | | | | | 80 | | | | |
| | PBT | | | | | | | | | | | 80 | | | |
| Adhesive Modifying Agent | Modified PE/PS | | 10 | 20 | 30 | 20 | 20 | 20 | 20 | 20 | 20 | 20 | | 10 | 20 |
| | Modified PE | | | | | | | | | | | | 20 | | |
| | Epoxy Group Amount (% by weight) | | 0.3 | 0.6 | 0.9 | 0.6 | 0.6 | 0.6 | 0.6 | 0.6 | 0.6 | 0.6 | 0.6 | 0.3 | 0.6 |
| Surface Treatment | Acrylic Acid (Monomer/Polymer) | MW: 72 | | | | ● | | | | | | | | | |
| | | MW: 5,000 | | | | | ● | | | | | | | | |
| | | MW: 10,000 | ● | ● | ● | | | | | | ● | ● | ● | | |
| | | MW: 25,000 | | | | | | ● | | | | | | | |
| | | MW: 800,000 | | | | | | | ● | | | | | | |
| | Acrylic Acid/Maleic Acid Copolymer | MW: 10,000 | | | | | | | | ● | | | | | |
| | Allylamine (Monomer/Polymer) | MW: 57 | | | | | | | | | | | | | |
| | | MW: 1,000 | | | | | | | | | | | | | |
| | | MW: 8,000 | | | | | | | | | | | | | |
| | | MW: 25,000 | | | | | | | | | | | | | |
| | Polyamide | | | | | | | | | | | | | ● | ● |
| Adhesiveness | | | A | A | A | A | A | A | A | A | A | A | A | A | A |

| | | | | | | | Example | | | | | |
|---|---|---|---|---|---|---|---|---|---|---|---|---|
| | | | 14 | 15 | 16 | 17 | 18 | 19 | 20 | 21 | 22 | 23 | 24 | 25 |
| Resin | PPS | | 70 | | | 90 | 80 | 70 | 80 | 80 | 80 | | | 80 |
| | PA66 | | | 80 | | | | | | | | 80 | | |
| | PBT | | | | 80 | | | | | | | | 80 | |
| Adhesive | Modified PE/PS | | 30 | 20 | 20 | 10 | 20 | 30 | 20 | 20 | 20 | 20 | 20 | 20 |

TABLE 1-continued

| | | | 1 | 2 | 3 | 4 | 5 | 6 | 7 | 8 | 9 | 10 | 11 | 12 |
|---|---|---|---|---|---|---|---|---|---|---|---|---|---|---|
| Modifying Agent | Modified PE | | | | | | | | | | | | | 20 |
| | Epoxy Group Amount (% by weight) | | 0.9 | 0.6 | 0.6 | 0.3 | 0.6 | 0.9 | 0.6 | 0.6 | 0.6 | 0.6 | 0.6 | 0.6 |
| Surface Treatment | Acrylic Acid (Monomer/ Polymer) | MW: 72 | | | | | | | | | | | | |
| | | MW: 5,000 | | | | | | | | | | | | |
| | | MW: 10,000 | | | | | | | | | | | | |
| | | MW: 25,000 | | | | | | | | | | | | |
| | | MW: 800,000 | | | | | | | | | | | | |
| | Acrylic Acid/Maleic Acid Copolymer | MW: 10,000 | | | | | | | | | | | | |
| | Allylamine (Monomer/ Polymer) | MW: 57 | | | | | | | | • | | | | |
| | | MW: 1,000 | | | | • | • | • | | | • | • | • | • |
| | | MW: 8,000 | | | | | | | • | | | | | |
| | | MW: 25,000 | | | | | | | | | • | | | |
| | Polyamide | | • | • | • | | | | | | | | | |
| Adhesiveness | | | A | A | A | A | A | A | A | A | A | A | A | A |

TABLE 2

| | | | Comparative Example | | | | | | | |
|---|---|---|---|---|---|---|---|---|---|---|
| | | | 1 | 2 | 3 | 4 | 5 | 6 | 7 | 8 |
| Resin | PPS | | 100 | | | 80 | | | 100 | |
| | PA66 | | | 100 | | | 80 | | | 100 |
| | PBT | | | | 100 | | | 80 | | |
| Adhesive | Modified PE/PS | | | | | 20 | 20 | 20 | | |
| Modifying Agent | Modified PE | | | | | | | | | |
| | Epoxy Group Amount (% by weight) | | | | | 0.6 | 0.6 | 0.6 | | |
| Surface Treatment | Acrylic Acid (Monomer/ Polymer) | MW: 72 | | | | | | | | |
| | | MW: 5,000 | | | | | | | | |
| | | MW: 10,000 | | | | | | | • | • |
| | | MW: 25,000 | | | | | | | | |
| | | MW: 800,000 | | | | | | | | |
| | Acrylic Acid/Maleic Acid Copolymer | MW: 10,000 | | | | | | | | |
| | Allylamine (Monomer/ Polymer) | MW: 57 | | | | | | | | |
| | | MW: 1,000 | | | | | | | | |
| | | MW: 8,000 | | | | | | | | |
| | | MW: 25,000 | | | | | | | | |
| | Polyamide | | | | | | | | | |
| Adhesiveness | | | B | B | B | B | B | B | B | A |

| | | | Comparative Example | | | | | | |
|---|---|---|---|---|---|---|---|---|---|
| | | | 9 | 10 | 11 | 12 | 13 | 14 | 15 |
| Resin | PPS | | | 100 | | | 100 | | |
| | PA66 | | | | 100 | | | 100 | |
| | PBT | | 100 | | | 100 | | | 100 |
| Adhesive | Modified PE/PS | | | | | | | | |
| Modifying Agent | Modified PE | | | | | | | | |
| | Epoxy Group Amount (% by weight) | | | | | | | | |
| Surface Treatment | Acrylic Acid (Monomer/ Polymer) | MW: 72 | | | | | | | |
| | | MW: 5,000 | | | | | | | |
| | | MW: 10,000 | • | | | | | | |
| | | MW: 25,000 | | | | | | | |
| | | MW: 800,000 | | | | | | | |
| | Acrylic Acid/Maleic Acid Copolymer | MW: 10,000 | | | | | | | |
| | Allylamine (Monomer/ Polymer) | MW: 57 | | | | | | | |
| | | MW: 1,000 | | | | | • | • | • |
| | | MW: 8,000 | | | | | | | |
| | | MW: 25,000 | | | | | | | |
| | Polyamide | | | • | • | • | | | |
| Adhesiveness | | | B | B | A | B | B | B | B |

TABLE 3

|  |  |  | Example | | | | | | | | | | | | | |
|---|---|---|---|---|---|---|---|---|---|---|---|---|---|---|---|---|
|  |  |  | 26 | 27 | 28 | 29 | 30 | 31 | 32 | 33 | 34 | 35 | 36 | 37 | 38 |
| Resin | PPS |  | 90 | 80 | 70 | 80 | 80 | 80 | 80 | 80 |  |  | 80 | 90 | 80 |
|  | PA66 |  |  |  |  |  |  |  |  |  | 80 |  |  |  |  |
|  | PBT |  |  |  |  |  |  |  |  |  |  | 80 |  |  |  |
| Adhesive Modifying Agent | Modified PE/PS |  | 10 | 20 | 30 | 20 | 20 | 20 | 20 | 20 | 20 | 20 |  | 10 | 20 |
|  | Modified PE |  |  |  |  |  |  |  |  |  |  |  | 20 |  |  |
|  | Epoxy Group Amount (% by weight) |  | 0.3 | 0.6 | 0.9 | 0.6 | 0.6 | 0.6 | 0.6 | 0.6 | 0.6 | 0.6 | 0.6 | 0.3 | 0.6 |
| Surface Treatment | Acrylic Acid (Monomer/Polymer) | MW: 72 |  |  |  | • |  |  |  |  |  |  |  |  |  |
|  |  | MW: 5,000 |  |  |  |  |  | • |  |  |  |  |  |  |  |
|  |  | MW: 10,000 | • | • | • |  | • |  |  |  |  | • | • | • |  |
|  |  | MW: 25,000 |  |  |  |  |  |  | • |  |  |  |  |  |  |
|  |  | MW: 800,000 |  |  |  |  |  |  |  | • |  |  |  |  |  |
|  | Acrylic Acid/Maleic Acid Copolymer | MW: 10,000 |  |  |  |  |  |  |  |  | • |  |  |  |  |
|  | Allylamine (Monomer/Polymer) | MW: 57 |  |  |  |  |  |  |  |  |  |  |  |  |  |
|  |  | MW: 1,000 |  |  |  |  |  |  |  |  |  |  |  |  |  |
|  |  | MW: 8,000 |  |  |  |  |  |  |  |  |  |  |  |  |  |
|  |  | MW: 25,000 |  |  |  |  |  |  |  |  |  |  |  |  |  |
|  | Polyamide |  |  |  |  |  |  |  |  |  |  |  |  | • | • |
| Adhesiveness |  |  | A | A | A | A | A | A | A | A | A | A | A | A | A |

|  |  |  | Example | | | | | | | | | | | |
|---|---|---|---|---|---|---|---|---|---|---|---|---|---|---|
|  |  |  | 39 | 40 | 41 | 42 | 43 | 44 | 45 | 46 | 47 | 48 | 49 | 50 |
| Resin | PPS |  | 70 |  |  | 90 | 80 | 70 | 80 | 80 | 80 |  |  | 80 |
|  | PA66 |  |  | 80 |  |  |  |  |  |  |  | 80 |  |  |
|  | PBT |  |  |  | 80 |  |  |  |  |  |  |  | 80 |  |
| Adhesive Modifying Agent | Modified PE/PS |  | 30 | 20 | 20 | 10 | 20 | 30 | 20 | 20 | 20 | 20 | 20 |  |
|  | Modified PE |  |  |  |  |  |  |  |  |  |  |  |  | 20 |
|  | Epoxy Group Amount (% by weight) |  | 0.9 | 0.6 | 0.6 | 0.3 | 0.6 | 0.9 | 0.6 | 0.6 | 0.6 | 0.6 | 0.6 | 0.6 |
| Surface Treatment | Acrylic Acid (Monomer/Polymer) | MW: 72 |  |  |  |  |  |  |  |  |  |  |  |  |
|  |  | MW: 5,000 |  |  |  |  |  |  |  |  |  |  |  |  |
|  |  | MW: 10,000 |  |  |  |  |  |  |  |  |  |  |  |  |  |
|  |  | MW: 25,000 |  |  |  |  |  |  |  |  |  |  |  |  |  |
|  |  | MW: 800,000 |  |  |  |  |  |  |  |  |  |  |  |  |  |
|  | Acrylic Acid/Maleic Acid Copolymer | MW: 10,000 |  |  |  |  |  |  |  |  |  |  |  |  |
|  | Allylamine (Monomer/Polymer) | MW: 57 |  |  |  |  |  |  |  | • |  |  |  |  |
|  |  | MW: 1,000 |  |  |  | • | • | • |  |  |  | • | • | • |
|  |  | MW: 8,000 |  |  |  |  |  |  | • |  |  |  |  |  |
|  |  | MW: 25,000 |  |  |  |  |  |  |  |  | • |  |  |  |
|  | Polyamide |  | • | • | • |  |  |  |  |  |  |  |  |  |
| Adhesiveness |  |  | A | A | A | A | A | A | A | A | A | A | A | A |

TABLE 4

|  |  |  | Comparative Example | | | | | | | |
|---|---|---|---|---|---|---|---|---|---|---|
|  |  |  | 16 | 17 | 18 | 19 | 20 | 21 | 22 | 23 |
| Resin | PPS |  | 100 |  |  | 80 |  |  | 100 |  |
|  | PA66 |  |  | 100 |  |  | 80 |  |  | 100 |
|  | PBT |  |  |  | 100 |  |  | 80 |  |  |
| Adhesive Modifying Agent | Modified PE/PS |  |  |  |  | 20 | 20 | 20 |  |  |
|  | Modified PE |  |  |  |  |  |  |  |  |  |
|  | Epoxy Group Amount (% by weight) |  |  |  |  | 0.6 | 0.6 | 0.6 |  |  |
| Surface Treatment | Acrylic Acid (Monomer/Polymer) | MW: 72 |  |  |  |  |  |  |  |  |
|  |  | MW: 5,000 |  |  |  |  |  |  |  |  |
|  |  | MW: 10,000 |  |  |  |  |  |  | • | • |
|  |  | MW: 25,000 |  |  |  |  |  |  |  |  |
|  |  | MW: 800,000 |  |  |  |  |  |  |  |  |
|  | Acrylic Acid/Maleic Acid Copolymer | MW: 10,000 |  |  |  |  |  |  |  |  |
|  | Allylamine (Monomer/Polymer) | MW: 57 |  |  |  |  |  |  |  |  |
|  |  | MW: 1,000 |  |  |  |  |  |  |  |  |
|  |  | MW: 8,000 |  |  |  |  |  |  |  |  |

TABLE 4-continued

| | | MW: 25,000 | | | | | | | | |
|---|---|---|---|---|---|---|---|---|---|---|
| | Polyamide | | | | | | | | | |
| Adhesiveness | | | B | B | B | B | B | B | B | A |

| | | | Comparative Example | | | | | | |
|---|---|---|---|---|---|---|---|---|---|
| | | | 24 | 25 | 26 | 27 | 28 | 29 | 30 |
| Resin | PPS | | | 100 | | 100 | | | |
| | PA66 | | | | 100 | | 100 | | |
| | PBT | | 100 | | | 100 | | | 100 |
| Adhesive Modifying Agent | Modified PE/PS | | | | | | | | |
| | Modified PE | | | | | | | | |
| | Epoxy Group Amount (% by weight) | | | | | | | | |
| Surface Treatment | Acrylic Acid (Monomer/ Polymer) | MW: 72 | | | | | | | |
| | | MW: 5,000 | | | | | | | |
| | | MW: 10,000 | • | | | | | | |
| | | MW: 25,000 | | | | | | | |
| | | MW: 800,000 | | | | | | | |
| | Acrylic Acid/Maleic Acid Copolymer | MW: 10,000 | | | | | | | |
| | Allylamine (Monomer/ Polymer) | MW: 57 | | | | | | | |
| | | MW: 1,000 | | | | | • | • | • |
| | | MW: 8,000 | | | | | | | |
| | | MW: 25,000 | | | | | | | |
| | Polyamide | | | • | • | • | | | |
| Adhesiveness | | | B | B | A | B | B | B | B |

The invention claimed is:

1. A composite material comprising:
   a metal portion composed of metal;
   a resin portion composed of resin;
   a polar functional group adhered to a surface of the metal portion, the polar functional group being at least one of a carboxyl group adhered by a monomer or polymer of acrylic acid and an amino group adhered by a monomer or polymer of allylamine; and
   an adhesion modifying agent mixed in the resin, the adhesive modifying agent being contained in a polymer selected from the group consisting of a modified ethylene-styrene copolymer modified by glycidyl methacrylate and a modified polyethylene modified by glycidyl methacrylate, the adhesive modifying agent including an epoxy adhesive functional group which interacts with the polar functional group, and a content of the epoxy adhesive functional group being from 0.15 to 1.2 weight percent of a total amount of the resin and the adhesive modifying agent, wherein
   the metal portion and the resin portion are bonded by at least a chemical bond between the polar functional group and the adhesive functional group.

2. The composite material according to claim 1, wherein the resin is an engineered plastic.

3. The composite material according to claim 2, wherein the engineered plastic is one of a polyphenylene sulfide, polyamide, and polybutylene terephthalate.

4. The composite material according to claim 1, wherein the metal is one of aluminum and copper.

5. The composite material according to claim 1, wherein an amount of the adhesive modifying agent is 5 to 40 parts by weight based on 100 parts by weight of total amount of the resin and the adhesive modifying agent.

6. A production method for a composite material in which a metal portion composed of metal and a resin portion composed of resin are bonded, the method comprising:
   treating a surface of the metal portion by adhering a polar functional group to a surface of the metal portion, the polar functional group being at least one of a carboxyl group of a monomer or polymer of acrylic acid and an amino group of a monomer or polymer of allylamine;
   preparing a molding material by mixing the resin with an adhesive modifying agent, the adhesive modifying agent being contained in a polymer selected from the group consisting of a modified ethylene-styrene copolymer modified by glycidyl methacrylate and a modified polyethylene modified by glycidyl methacrylate, the adhesive modifying agent including an epoxy adhesive functional group which chemically bonds with the polar functional group, and a content of the epoxy adhesive functional group being from 0.15 to 1.2 weight percent of a total amount of the resin and the adhesive modifying agent;
   molding the resin portion from the molding material so that the resin portion contacts with the metal portion; and
   bonding the metal portion and the resin portion at least by the chemical bonding between the polar functional group and the epoxy adhesive functional group.

7. The production method according to claim 6, wherein the treating the surface of the metal portion includes adhering to the surface of the metal portion one of a monomer of acrylic acid, a polymer of acrylic acid, and a copolymer of acrylic acid and maleic acid.

8. The production method according to claim 6, wherein the treating the surface of the metal portion comprises adhering the carboxyl group and the amino group to the surface of the metal portion with polyamide.

9. The composite material according to claim 6, wherein an amount of the adhesive modifying agent is 5 to 40 parts by weight based on 100 parts by weight of total amount of the resin and the adhesive modifying agent.

10. A composite material comprising:
    a metal portion;
    a resin portion; and
    an adhesion region adhering the metal portion to the resin portion,
    wherein the adhesion region comprises:
    a polar functional group that is at least one of a carboxyl group and an amino group adhered to a surface of the metal portion, the polar functional group being contained in a member selected from the group consisting of a monomer of acrylic acid, a polymer of acrylic acid, a copolymer of acrylic acid and maleic acid, a monomer of allylamine and a polymer of allylamine, an adhesive modifying agent being contained in a resin layer of a polymer selected from the group consisting of a modified ethylene-styrene copolymer modified by glycidyl methacrylate and a modified polyethylene modified by glycidyl methacrylate, the adhesive modifying agent having an epoxy adhesive functional group mixed within the resin layer, the epoxy adhesive functional group extending from a surface of the resin layer, and a content of the epoxy adhesive functional group being from 0.15 to 1.2 weight percent of a total amount of the resin and the adhesive modifying agent, and the polar functional group adhered to the surface of the metal portion is chemically bonded to the adhesive functional group extending from the surface of the resin layer.

11. The composite material according to claim 10, wherein the epoxy adhesive functional group is contained within an epoxy adhesive modifying agent, and the epoxy adhesive modifying agent is 5 to 40 parts by weight based on 100 parts by weight of total amount of the resin and the epoxy adhesive modifying agent.

* * * * *